(12) United States Patent
Sternberger

(10) Patent No.: US 8,091,335 B2
(45) Date of Patent: Jan. 10, 2012

(54) SWEPT FAN RAMP FOR PIVOT DOOR THRUST REVERSER

(75) Inventor: Joe E. Sternberger, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 968 days.

(21) Appl. No.: 12/031,191

(22) Filed: Feb. 14, 2008

(65) Prior Publication Data

US 2009/0205312 A1 Aug. 20, 2009

(51) Int. Cl.
*F02K 1/54* (2006.01)

(52) U.S. Cl. ............ 60/226.2; 60/770; 60/230; 60/228; 244/110 B; 454/305

(58) Field of Classification Search ................. 60/226.2, 60/230, 232, 770; 244/110 B; 239/265.25; 454/305

See application file for complete search history.

(56) References Cited

U.S. PATENT DOCUMENTS

| 4,147,027 | A | | 4/1979 | Greathouse | |
|---|---|---|---|---|---|
| 4,278,220 | A | | 7/1981 | Johnston et al. | |
| 4,922,712 | A | | 5/1990 | Matta et al. | |
| 4,998,409 | A | * | 3/1991 | Mutch | 60/226.2 |
| 2009/0126339 | A1 | * | 5/2009 | Lair | 60/226.2 |

FOREIGN PATENT DOCUMENTS

FR 2601077 A1 * 1/1988

* cited by examiner

*Primary Examiner* — Ehud Gartenberg
*Assistant Examiner* — Steven Sutherland
(74) *Attorney, Agent, or Firm* — Hovey Williams LLP

(57) ABSTRACT

A swept fan ramp for a pivot door thrust reverser includes a cylindrical unit with an elliptical flared portion, a side portion, and a rectangular flared portion. The elliptical flared portion is operable to reduce drag on airflow in a reverse direction and is coupled to the top center and bottom center of the circumference of the cylindrical unit. The side portion is operable to reduce side spillage airflow and is coupled to the central left side and central right side of the aft circumference of the cylindrical unit. The rectangular flared portion is operable to promote separation of airflow into an upper airflow path and a lower airflow path, is coupled with the aft circumference of the cylindrical unit, and is connected to the elliptical flared portion and the side portion.

24 Claims, 4 Drawing Sheets

SWEPT FAN RAMP FOR PIVOT DOOR THRUST REVERSER

BACKGROUND OF THE INVENTION

1. Field of the Invention

Embodiments of the present invention relate to a fan ramp of a pivot door thrust reverser. More particularly, embodiments of the present invention relate to a fan ramp with a variable shape at the aft end.

2. Description of the Related Art

Airplane engines on business or regional jets often include pivot door type thrust reversers. Generally, there are two pivot doors at the aft portion of the engine—one that opens (or pivots) in the up direction and one that opens in the down direction. The engine also includes a fan ramp that guides airflow past the turbine when reverse thrust is not needed and the pivot doors are stowed. When reverse thrust is needed, the pivot doors are deployed and the fan ramp helps to guide airflow in the reverse direction.

Ideally, during reverse thrust, air should flow through the fan ramp and split evenly as it encounters the pivot doors. Half the airflow should go in the up direction and be guided back to the forward part of the engine and the other half of the airflow should go in the down direction and be guided back to the forward part of the engine. Typically, the fan ramp has a curved or flared portion that is uniform around the circumference of the aft section. This uniform trailing edge of the fan ramp may allow some of the airflow to go in either the left or right direction, avoiding the deployed pivot doors and not getting redirected back to the forward part of the engine—a condition know as side spillage. As a result, the ability of the engine to efficiently redirect airflow is diminished and reverse thrust is reduced.

SUMMARY OF THE INVENTION

Embodiments of the present invention solve the above-mentioned problems and provide a distinct advance in the art of pivot door thrust reverser fan ramps. More particularly, embodiments of the invention provide a fan ramp with a variable shape at the aft end that reduces side spillage and increases reverse thrust by promoting separation of airflow.

One embodiment of the swept fan ramp includes a cylindrical unit with an elliptical flared portion, a side portion, and a rectangular flared portion. The cylindrical unit is generally cylindrical in shape and surrounds the turbine in order to pass turbine airflow.

The elliptical flared portion is operable to reduce drag on airflow in a reverse direction and is coupled to the top center and bottom center of the circumference of the cylindrical unit. The elliptical flared portion has a cross section of approximately a quadrant of an ellipse with a roughly 2:1 ratio elliptical curve.

The side portion is operable to reduce side spillage airflow and is coupled to the central left side and central right side of the aft circumference of the cylindrical unit. The side portion includes a small outward flare at the aft end.

The rectangular flared portion is operable to promote separation of airflow into an upper airflow path and a lower airflow path, is coupled with the aft circumference of the cylindrical unit, and is connected to the elliptical flared portion and the side portion. The rectangular flared portion has a cross section of approximately a quadrant of a rectangle with a rounded corner.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
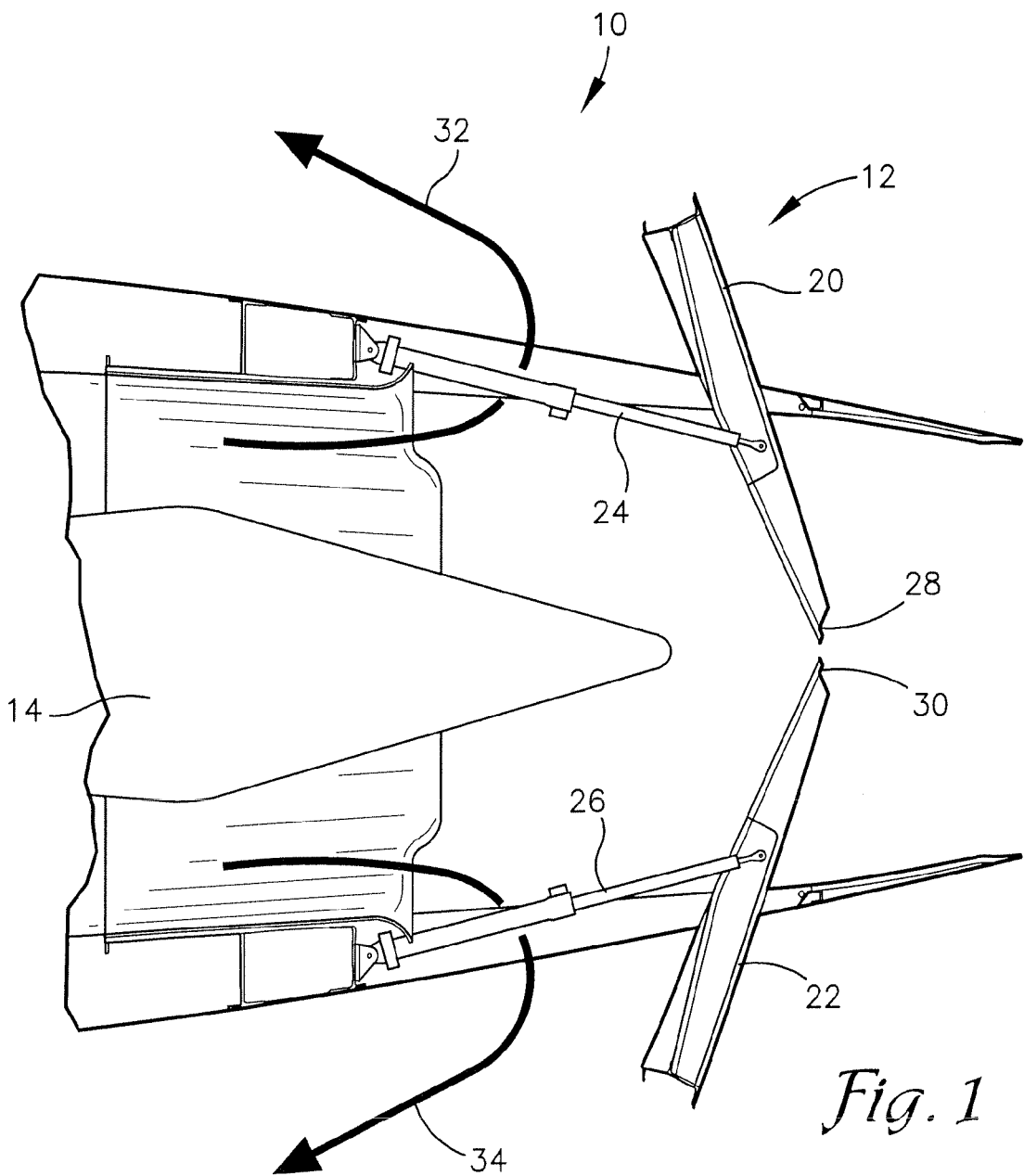
FIG. 1 is a central, vertical cross section of a portion of a jet engine that includes a pivot door thrust reverser, depicting the pivot doors in the deployed position.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

An airplane engine 10 that includes a pivot-door type thrust reverser 12 is depicted in FIG. 1 which shows a cross section of the engine 10 through a central, vertical plane. The engine 10 includes a turbine portion 14. When reverse thrust is needed, the engine 10 deploys, or opens, an upper pivot door 20 and a lower pivot door 22 as shown in FIG. 1. The upper and lower pivot doors 20, 22 are opened by the extension of an upper actuator 24 and a lower actuator 26, respectively. During deployment, an aft portion 28 of the upper pivot door 20 moves downward and an aft portion 30 of the lower pivot door 22 moves upward until the two pivot door aft portions 28, 30 come into close proximity. This action nearly closes off the air pathway that provides normal forward thrust of the airplane engine 10 and creates two new pathways for the air to flow—an upper airflow pathway 32 and a lower airflow pathway 34. Ideally, the airflow splits along a horizontal plane through the center of the engine, wherein air above the horizontal plane follows the upper airflow pathway 32 and air below the horizontal plane follows the lower airflow pathway 34. Airflow along other pathways, particularly sideways airflow, is minimized. Reducing airflow along other pathways increases the efficiency of the thrust reverser 12. Redirecting the airflow evenly into the upper airflow pathway 32 and the lower airflow pathway 34 provides uniformly distributed reverse thrust and avoids an imbalance when slowing the airplane down.

Figure 2:
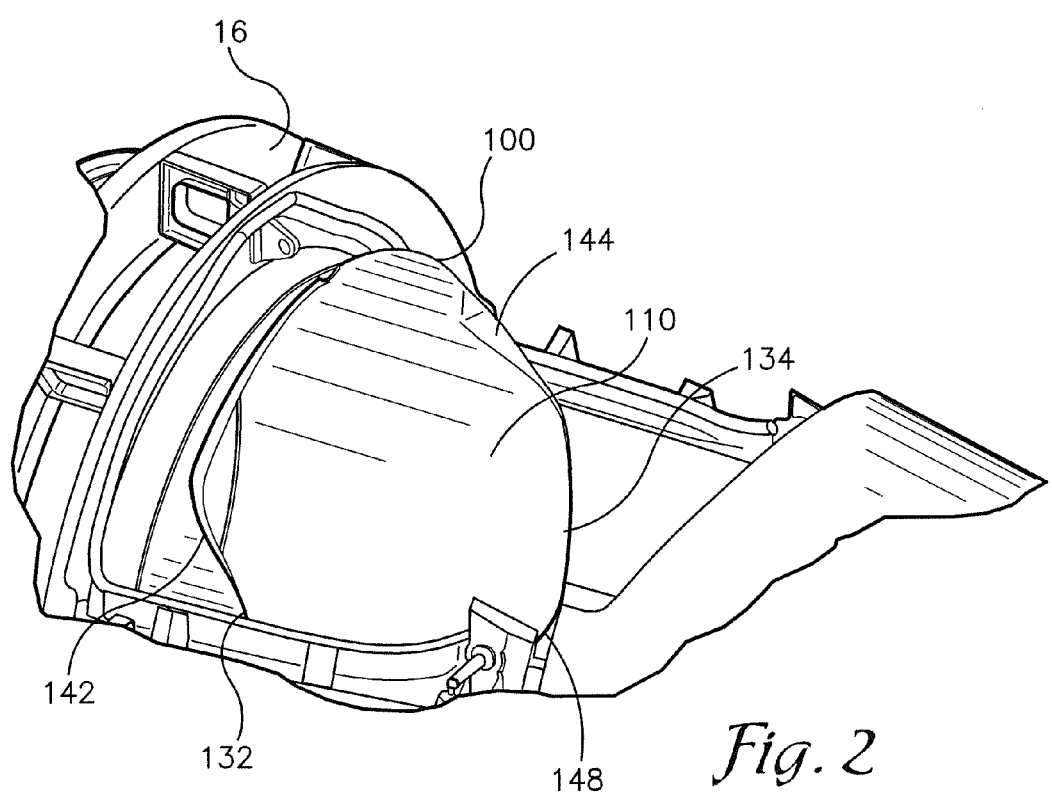
FIG. 2 is a perspective view of a portion of a jet engine that includes a fan ramp constructed in accordance with various embodiments of the invention.

The thrust reverser 12 also includes a fan ramp 100. FIG. 2 shows the fan ramp 100 visible in a portion of the thrust reverser 12 with the pivot doors 20, 22. The fan ramp 100 is attached to the frame 16 near the forward section of the thrust reverser 12.

Figure 3:
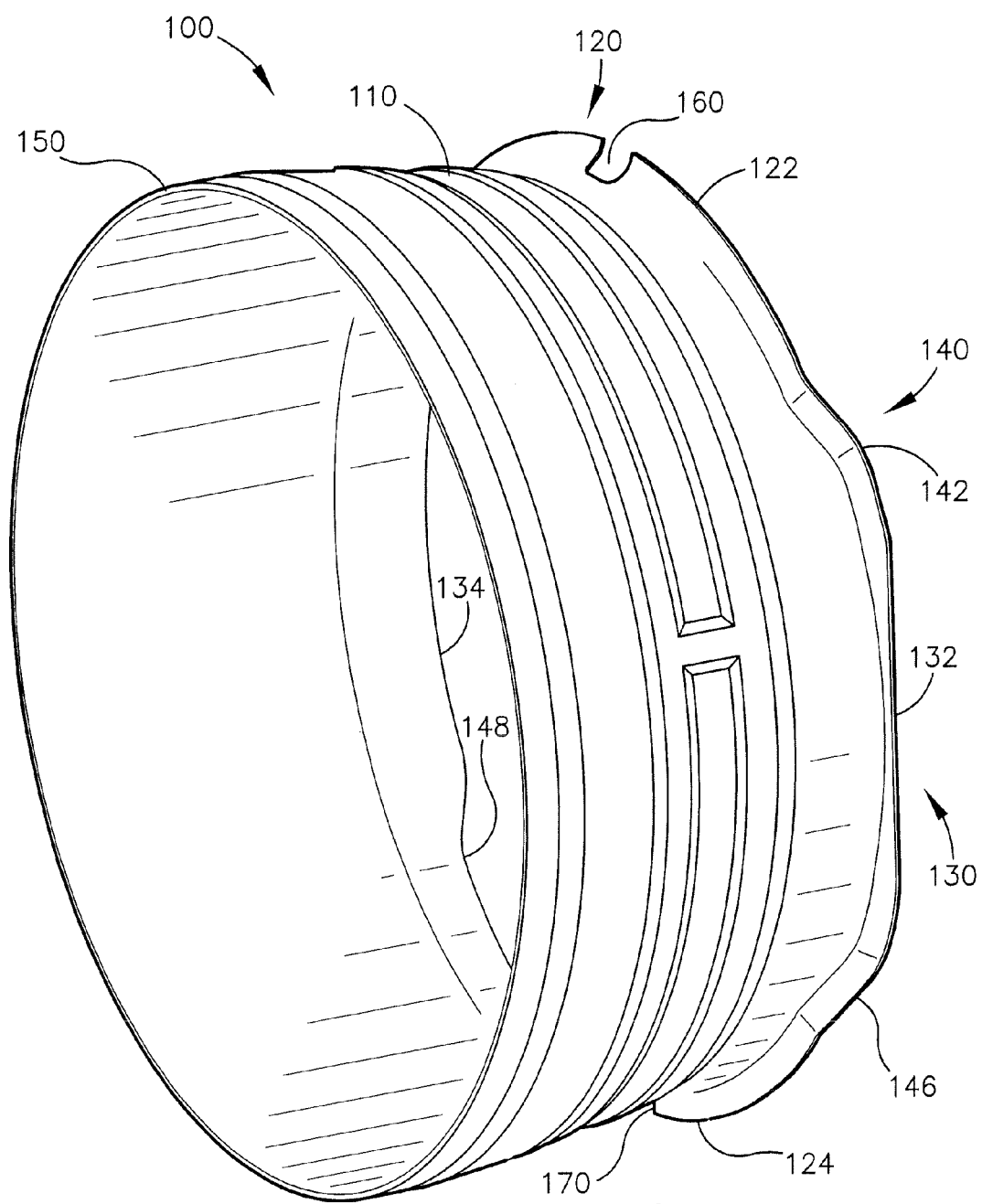
FIG. 3 is a perspective view of the fan ramp from the forward perspective looking aft.
Figure 4:
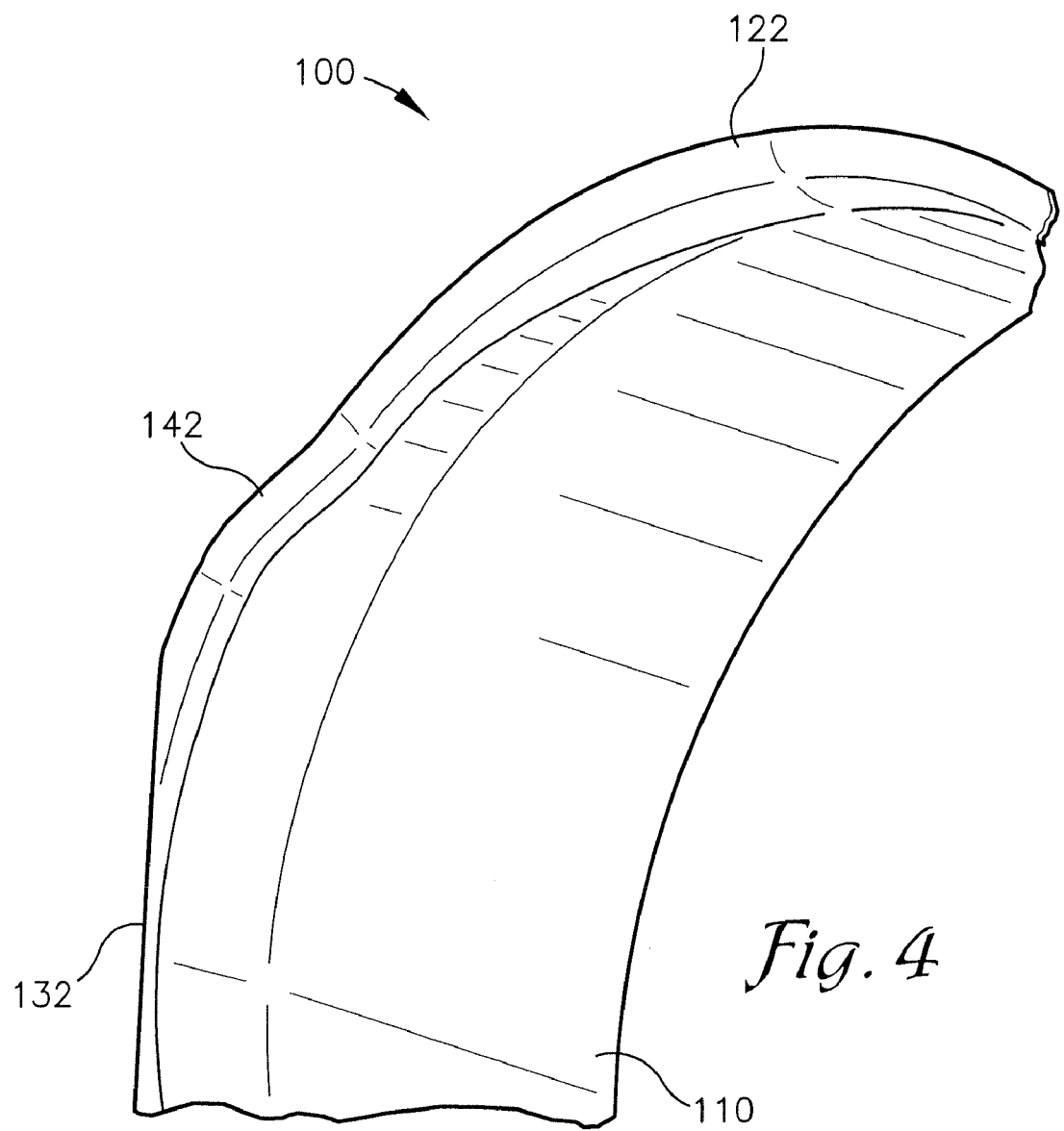
FIG. 4 is a perspective view of a portion of the fan ramp including an elliptical flared portion, a rectangular flared portion, and a side portion.

The fan ramp 100 is shown in isolation in FIG. 3 and FIG. 4. In various embodiments, the fan ramp 100 comprises a cylindrical unit 110, an elliptical flared portion 120, a side portion 130, and a rectangular flared portion 140. The cylindrical unit 110 is generally cylindrical in shape and may be integrated with the aft portion of a fan duct 150. The cylindrical unit 110 surrounds the aft section of the turbine 14, leaving a gap between the inner portion of the cylindrical unit 110 and the turbine 14 that creates an airflow pathway.

The elliptical flared portion 120 of the fan ramp 100 includes an upper elliptical flared portion 122 coupled to the top central region of the aft circumference of the cylindrical unit 110 and a lower elliptical flared portion 124 coupled to the bottom central region of the aft circumference of the cylindrical unit 110. The upper elliptical flared portion 122 is operable to reduce drag on airflow in the upper airflow pathway 32, and the lower elliptical flared portion 124 is operable to reduce drag on airflow in the lower airflow pathway 34.

In various embodiments, the upper elliptical flared portion 122 includes an upper notch 160, located in the center region, that is operable to allow space for the upper actuator 24 to move in the vertical direction during deployment of the pivot doors 20, 22. Similarly, the lower elliptical flared portion 124 includes a lower notch 170, located in the center region, that is operable to allow space for the lower actuator 26 to move in the vertical direction during deployment of the pivot doors 20, 22.

In various embodiments, the upper and lower elliptical flared portions 122, 124 have a cross section near the center that is approximately a quadrant of an ellipse with a roughly 2:1 ratio elliptical curve. The upper and lower elliptical flared portions 122, 124 extend in the aft direction approximately 4 inches and extend outward from the center of the cylindrical unit 110 approximately 1.75 inches. The cross-sectional shape of the upper and lower elliptical flared portions 122, 124 varies when traversing across the elliptical flared portions 122, 124 in a direction away from the center region. The horizontal and vertical curved regions of the elliptical flared portion 120 tend to flatten at the edges of the elliptical flared portion 120.

In various embodiments, the side portion 130 is operable to reduce side spillage airflow. The side portion 130 includes a left side portion 132, which is coupled to the center of the left side of the aft circumference of the cylindrical unit 110, and a right side portion 134, which is coupled to the center of the right side of the aft circumference of the cylindrical unit 110. The side portion 130 is generally an extension of the cylindrical unit with a small outward flair at the aft end. The side portion 130 is greater in length along the axis of the cylindrical unit 110 than the elliptical flared portion 120 and extends in the aft direction from the cylindrical unit 110. The length of the side portion 130 beyond the elliptical flared portion 120 may be approximately 2 inches.

In various embodiments, the rectangular flared portion 140 is operable to promote separation of airflow into the upper airflow pathway 32 and the lower airflow pathway 34. Generally, the rectangular flared portion 140 is coupled to the aft circumference of the cylindrical unit 110 and connected to the elliptical flared portion 120 and the side portion 130. The rectangular flared portion 130 includes an upper left rectangular flared portion 142, an upper right rectangular flared portion 144, a lower left rectangular flared portion 146, and a lower right rectangular flared portion 148. The upper left rectangular flared portion 142 is connected to the upper elliptical flared portion 122 and the left side portion 132. The upper right rectangular flared portion 144 is connected to the upper elliptical flared portion 122 and the right side portion 134. The lower left rectangular flared portion 146 is connected to the lower elliptical flared portion 124 and the left side portion 132. The lower right rectangular flared portion 148 is connected to the lower elliptical flared portion 124 and the right side portion 134.

In various embodiments, the rectangular flared portion 140 has a cross section that is approximately a quadrant of a rectangle with a rounded corner. The radius of curvature of the rounded corner varies across the rectangular flared portion 140. In the area near the elliptical flared portion 120, the radius of curvature of the rectangular flared portion 140 is relatively large. In the area near the side portion 130, the radius of curvature is relatively small. In addition, the length of the rectangular flared portion 140 along the axis of the cylindrical unit 110 increases and extends in the aft direction from the cylindrical unit 110 when traversing from the elliptical flared portion 120 to the side portion 130. Furthermore, the length of the outward flare, which may be the side of the rectangular cross section that extends outward from the axis of cylindrical unit 110, decreases when traversing from the elliptical flared portion 120 to the side portion 130.

Generally, the notions of left side and right side, upper half and lower half apply to various embodiments of the present invention when the fan ramp 100 is viewed from the aft end of the airplane engine 10, looking in the forward direction. However, various embodiments of the fan ramp 100 are symmetric about both a central horizontal plane and a central vertical plane. Thus, descriptions of various embodiments of components on the right side of the fan ramp 10 apply equally to embodiments of components of the left side, and vice versa. Likewise, descriptions of various embodiments of components on the upper half of the fan ramp 10 apply equally to various embodiments of components on the lower half, and vice versa.

In various embodiments, the fan duct 150 and the components of the fan ramp 100, including the cylindrical unit 110, the elliptical flared portion 120, the side portion 130, and the rectangular flared portion 140, form a single monolithic structure. The fan duct 150 and the fan ramp 100 may be manufactured from graphite and epoxy, steel, aluminum, combinations thereof, and the like. The fan duct 150 and the fan ramp 100 may be manufactured as a layup that is cured in an autoclave, although other manufacturing techniques are possible.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A fan ramp for a pivot door turbofan thrust reverser, the fan ramp comprising:

a cylindrical unit, operable to pass airflow from a turbine;

an elliptical flared portion, operable to reduce drag on airflow in a reverse direction, the elliptical flared portion coupled with an aft circumference of the cylindrical unit;

a side portion, operable to reduce side spillage airflow, the side portion coupled with the aft circumference of the cylindrical unit; and a rectangular flared portion, operable to promote separation of airflow into an upper airflow path and a lower airflow path, the rectangular flared portion coupled with the aft circumference of the cylindrical unit and connected to the elliptical flared portion and the side portion.

2. The fan ramp of claim 1, wherein the cylindrical unit is integrated with a fan duct.

3. The fan ramp of claim 1, wherein the cylindrical unit, the elliptical flared portion, the rectangular flared portion, and the side portion form a monolithic structure.

4. The fan ramp of claim 1, wherein the elliptical flared portion is located at the top center and bottom center of the circumference of the cylindrical unit.

5. The fan ramp of claim 1, wherein the elliptical flared portion includes a pair of notches operable to allow movement of a pair of pivot door actuators, the pair of notches located in the top center and bottom center of the elliptical flared portion.

6. The fan ramp of claim 1, wherein the cross section of the elliptical flared portion is approximately a quadrant of an ellipse with a roughly 2:1 ratio elliptical curve.

7. The fan ramp of claim 1, wherein the cross section of the rectangular flared portion is approximately a quadrant of a rectangle with a rounded corner.

8. The fan ramp of claim 7, wherein the radius of curvature of the rounded corner decreases when traversing from the elliptical flared portion to the side portion.

9. The fan ramp of claim 1, wherein the length of the rectangular flared portion along the axis of the cylindrical unit increases and extends in the aft direction from the cylindrical unit, when traversing from the elliptical flared portion to the side portion.

10. The fan ramp of claim 1, wherein the side portion is located at the left center and right center of the aft circumference of the cylindrical unit.

11. The fan ramp of claim 1, wherein the side portion is generally an extension of the cylindrical unit, with a small outward flare at the aft end, the side portion being greater in length along the axis of the cylindrical unit than the elliptical flared portion and extends in the aft direction from the cylindrical unit.

12. A fan ramp for a pivot door turbofan thrust reverser, the fan ramp comprising:

a cylindrical unit, operable to pass airflow from a turbine, the cylindrical unit integrated with a fan duct;

an elliptical flared portion, operable to reduce drag on airflow in a reverse direction, the elliptical flared portion having a cross section of approximately a quadrant of an ellipse with a roughly 2:1 ratio elliptical curve and coupled with the aft circumference of the cylindrical unit;

a side portion, operable to reduce side spillage airflow, the side portion including a small outward flare at the aft end and coupled with the aft circumference of the cylindrical unit; and a rectangular flared portion, operable to promote separation of airflow into an upper airflow path and a lower airflow path, the rectangular flared portion having a cross section of approximately a quadrant of a rectangle with a rounded corner and coupled with the aft circumference of the cylindrical unit.

13. The fan ramp of claim 12, wherein the cylindrical unit, the elliptical flared portion, the rectangular flared portion, and the side portion form a monolithic structure.

14. The fan ramp of claim 12, wherein the elliptical flared portion includes a pair of notches operable to allow movement of a pair of pivot door actuators, the pair of notches located in the top center and bottom center of the elliptical flared portion.

15. The fan ramp of claim 12, wherein the elliptical flared portion is located at the top center and bottom center of the circumference of the cylindrical unit.

16. The fan ramp of claim 12, wherein the radius of curvature of the rounded corner decreases when traversing from the elliptical flared portion to the side portion.

17. The fan ramp of claim 12, wherein the length of the rectangular flared portion along the axis of the cylindrical unit increases and extends in the aft direction from the cylindrical unit, when traversing from the elliptical flared portion to the side portion.

18. The fan ramp of claim 12, wherein the side portion is generally an extension of the cylindrical unit, the side portion being greater in length along the axis of the cylindrical unit than the elliptical flared portion and extends in the aft direction from the cylindrical unit.

19. A fan ramp for a pivot door turbofan thrust reverser, the fan ramp comprising:

a cylindrical unit, operable to pass airflow from a turbine, the cylindrical unit integrated with a fan duct;

an upper elliptical flared portion, operable to reduce drag on airflow in an upper airflow path, the upper elliptical flared portion having a cross section of approximately a quadrant of an ellipse with a roughly 2:1 ratio elliptical curve and coupled with the top center aft circumference of the cylindrical unit;

a lower elliptical flared portion, operable to reduce drag on airflow in a lower airflow path, the lower elliptical flared portion having a cross section of approximately a quadrant of an ellipse with a roughly 2:1 ratio elliptical curve and coupled with the bottom center aft circumference of the cylindrical unit;

a left side portion, operable to reduce spillage airflow on the left side of an airplane engine, the side portion including a small outward flare at the aft end and coupled with the left center of the aft circumference of the cylindrical unit;

a right side portion, operable to reduce spillage airflow on the right side of the airplane engine, the side portion including a small outward flare at the aft end and coupled with the right center of the aft circumference of the cylindrical unit;

a rectangular flared portion, operable to promote separation of airflow into an upper airflow path and a lower airflow path, the rectangular flared portion having a cross section of approximately a quadrant of a rectangle with a rounded corner, coupled with the aft circumference of the cylindrical unit, and connected to the upper elliptical flared portion, the lower elliptical flared portion, the left side portion, and the right side portion.

20. The fan ramp of claim 19, wherein the cylindrical unit, the upper elliptical flared portion, the lower elliptical flared portion, the rectangular flared portion, the left side portion, and the right side portion form a monolithic structure.

21. A fan ramp for a pivot door turbofan thrust reverser, the fan ramp comprising:

a cylindrical unit, operable to pass airflow from a turbine;

an elliptical flared portion, operable to reduce drag on airflow in a reverse direction, the elliptical flared portion coupled with an aft circumference of the cylindrical unit and including a first outward flare with an elliptical cross-sectional shape;

a side portion, operable to reduce side spillage airflow, the side portion coupled with the aft circumference of the cylindrical unit and including a second outward flare that is located farther aftward than the elliptical flared portion; and a rectangular flared portion, operable to promote separation of airflow into an upper airflow path and a lower airflow path, the rectangular flared portion coupled with the aft circumference of the cylindrical unit and positioned between the elliptical flared portion and the side portion, the rectangular flared portion including a third outward flare with a planar shape that couples to the first outward flare and extends aftward to couple with the second aftward flare.

22. The fan ramp of claim 21, wherein the cross section of the elliptical flared portion is approximately a quadrant of an ellipse with a roughly 2:1 ratio elliptical curve.

23. The fan ramp of claim 21, wherein the cross section of the rectangular flared portion is approximately a quadrant of a rectangle with a rounded corner.

24. The fan ramp of claim 23, wherein the radius of curvature of the rounded corner decreases when traversing from the elliptical flared portion to the side portion.

* * * * *